UNITED STATES PATENT OFFICE.

ABRAHAM MALLETT, OF ERIE, PENNSYLVANIA.

IMPROVED MODE OF TREATING POTATOES TO PREVENT POTATO-ROT.

Specification forming part of Letters Patent No. 53,159, dated March 13, 1866.

*To all whom it may concern:*

Be it known that I, ABRAHAM MALLETT, of the city of Erie, in the county of Erie and State of Pennsylvania, have invented a new and useful Mode of Planting and Growing Potatoes, which will prevent the disease known as the "potato-rot," of which mode the following is a full, clear, and exact description, viz:

Cut the seed-potatoes in slices not exceeding three-fourths of an inch in thickness; then stir the slices in dry fine salt and leave them covered with salt thirty minutes for the salt to extract the juice of the potato and to destroy that which produces the potato-rot; then plant in raised hills or ridges, and as soon as the potatoes are well blossomed ventilate the hill by running a pointed stick or walking-cane through the potato-hill to the bottom down to the subsoil, and draw out the stick or cane, so as to leave the hole open to the bottom of the hill.

What I claim as my invention, and desire to secure by Letters Patent, is—

The mode of preparing the seed-potatoes by extracting the juice by salt and ventilating the hills, as set forth.

ABRAHAM × MALLETT.
his    mark.

Witnesses:
    E. WHITLEY,
    ALBERT ROSS.